(12) United States Patent
Leppanen et al.

(10) Patent No.: US 12,381,424 B2
(45) Date of Patent: Aug. 5, 2025

(54) MEDIATED REALITY WITH WIRELESS CHARGING

(71) Applicant: Nokia Technologies Oy, Espoo (FI)

(72) Inventors: Jussi Artturi Leppanen, Tampere (FI); Sujeet Shyamsundar Mate, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 587 days.

(21) Appl. No.: 17/831,549

(22) Filed: Jun. 3, 2022

(65) Prior Publication Data

US 2022/0399761 A1 Dec. 15, 2022

(30) Foreign Application Priority Data

Jun. 10, 2021 (GB) ..................... 2108276

(51) Int. Cl.
*H02J 50/90* (2016.01)
*G02B 27/01* (2006.01)
*H02J 50/12* (2016.01)
*H02J 50/20* (2016.01)
*H02J 50/80* (2016.01)

(52) U.S. Cl.
CPC ............ *H02J 50/90* (2016.02); *G02B 27/017* (2013.01); *H02J 50/12* (2016.02); *H02J 50/20* (2016.02); *H02J 50/80* (2016.02); *G02B 2027/014* (2013.01); *G02B 2027/0141* (2013.01)

(58) Field of Classification Search
CPC .... H02J 50/90; H02J 50/80; G02B 2027/014; G02B 2027/0141; G06F 3/011; G06F 3/012
USPC ........................................................ 320/108
See application file for complete search history.

(56) References Cited

U.S. PATENT DOCUMENTS

| | | | | |
|---|---|---|---|---|
| 11,169,598 B2 * | 11/2021 | Leppänen | ........... | G06F 3/04815 |
| 11,244,659 B2 * | 2/2022 | Laaksonen | ............... | G09G 5/38 |
| 11,269,300 B2 * | 3/2022 | Piaskowski | ............ | G05B 15/02 |
| 11,460,698 B2 * | 10/2022 | Bucknor | ............... | G02B 27/017 |
| 11,601,532 B2 * | 3/2023 | Patil | ........................ | G06F 21/72 |
| 2023/0291244 A1 * | 9/2023 | Kasar | ........................ | H04B 5/26 |

* cited by examiner

*Primary Examiner* — Richard V Muralidar
(74) *Attorney, Agent, or Firm* — McCarter & English LLP

(57) ABSTRACT

An apparatus including circuitry configured for: wireless charging an energy storage device in the apparatus; using energy from wireless charging and/or the energy storage device to render mediated reality content to a user of the apparatus, wherein the mediated reality content rendered to the user is a virtual scene determined by a virtual point of view within a virtual space, wherein a real point of view of the user, defined by a location and orientation of the user in real space, determines, via a mapping between the virtual space and the real space, the virtual point of view within the virtual space of the virtual user; and in dependence upon a wireless charging parameter, changing the mapping between the real space and the virtual space to enable improvement of the wireless charging parameter.

20 Claims, 7 Drawing Sheets

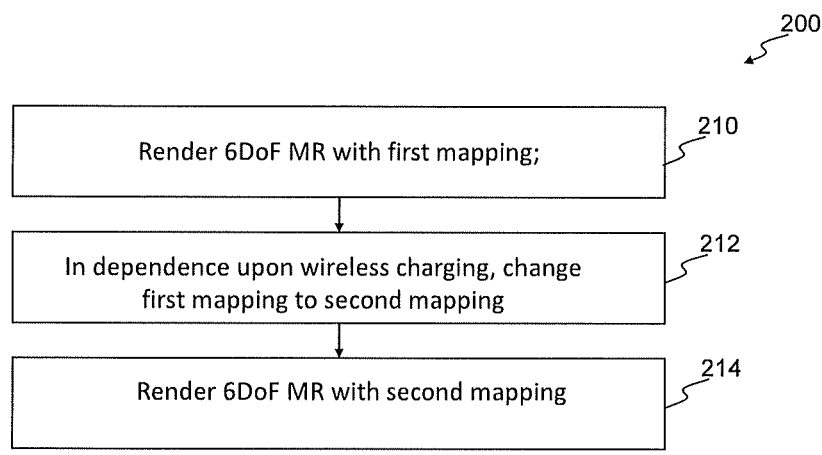
FIG 15
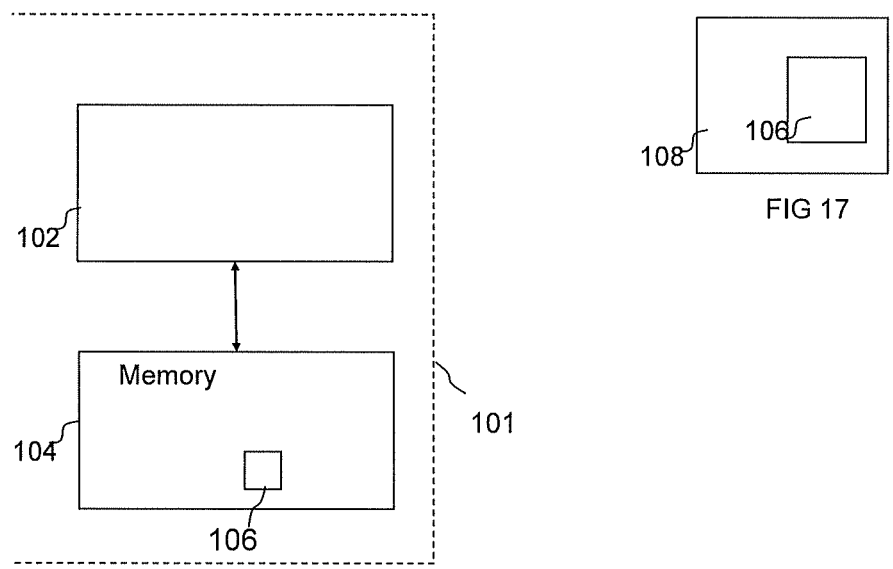
FIG 17
FIG 16

MEDIATED REALITY WITH WIRELESS CHARGING

TECHNOLOGICAL FIELD

Embodiments of the present disclosure relate to mediated reality with wireless charging.

BACKGROUND

Mediated reality (also referred to as extended reality), allows a user to experience, for example visually, a fully or partially artificial environment (a virtual space) as a virtual scene at least partially rendered by an apparatus to the user. The virtual scene is determined by a point of view (virtual position) within the virtual space of a virtual user.

Often mediated reality is first person perspective mediated reality. The user's real point of view (location and/or orientation) determines, via a mapping between the virtual space and the real space, the point of view (virtual position) within the virtual space of the virtual user.

Six degrees of freedom (6 DoF) describes, in relation to first person perspective-mediated reality, where the virtual position is determined by both the user's orientation and the user's location in the real space.

Wireless charging enables energy to be transferred from a wireless charging station to another device without the use of wires or other physical connections. Wireless charging transfers electromagnetic energy from the wireless charging station to the other device.

The energy transfer can, in some examples, be achieved via inductive coupling or resonant inductive coupling. The energy transfer can, in some examples, be achieved via directed transmission of electromagnetic waves, for example beamformed transmission of radio waves.

It would be desirable to enable wireless charging in a device configured for mediated reality.

It would be desirable to enable wireless charging in a device configured for first-person perspective, six degrees of freedom mediated reality.

BRIEF SUMMARY

According to various, but not necessarily all, embodiments there is provided an apparatus comprising means for:
wireless charging an energy storage device comprised in the apparatus;
using energy from wireless charging and/or the energy storage device to render mediated reality content to a user of the apparatus, wherein the mediated reality content rendered to the user is a virtual scene determined by a virtual point of view within a virtual space, wherein a real point of view of the user, defined by a location and orientation of the user in real space, determines, via a mapping between the virtual space and the real space, the virtual point of view within the virtual space of the virtual user; and
in dependence upon a wireless charging parameter, changing the mapping between the real space and the virtual space to enable improvement of the wireless charging parameter.

According to some but not necessarily all examples, the apparatus is configured as a head-mounted device and comprises means for measuring a change in the location and orientation in real space of a user wearing the head-mounted device to determine at least a change in the real point of view of the user; and rendering mediated reality content as a virtual scene determined by a virtual point of view that maps via the mapping to the real point of view of the user.

According to some but not necessarily all examples, a change in the wireless charging parameter has a correlation with a change in wireless charging or wherein a change in the wireless charging parameter has a correlation with a change in energy consumption from rendering without a corresponding change in wireless charging.

According to some but not necessarily all examples, the wireless charging parameter is a parameter indicative of a rate of wireless charging decreasing below a threshold, and/or the wireless charging parameter is a parameter indicative that the apparatus is more than a threshold distance from a wireless charging station, and/or the wireless charging parameter is a parameter indicative of an occlusion between the apparatus and a wireless charging station.

According to some but not necessarily all examples, the apparatus comprises means for measuring the wireless charging parameter.

According to some but not necessarily all examples, the virtual space comprises a plurality of artificial virtual objects, and wherein changing the mapping between the real space and the virtual space changes at least a portion of the mapping that maps at least a location in the virtual space of at least one artificial virtual object to a corresponding location in the real space to bring the corresponding location closer to a wireless charging station or to avoid an obstruction between the apparatus and a wireless charging station.

According to some but not necessarily all examples, the apparatus comprises means for selecting the artificial virtual object based on actual or expected energy consumption associated with rendering the artificial virtual object.

According to some but not necessarily all examples, the apparatus comprises means for selecting the artificial virtual object based on characteristics of the artificial virtual object, wherein selection is biased to select multichannel audio objects.

According to some but not necessarily all examples, changing the mapping between the real space and the virtual space comprises changing the mapping of multiple artificial virtual objects of the virtual space to the real space to optimize the wireless charging parameter.

According to some but not necessarily all examples, changing the mapping between the real space and the virtual space comprises rotating, translating and/or re-sizing the virtual space relative to the real space.

According to some but not necessarily all examples, the apparatus comprises means for controlling download of mediated reality content to the apparatus in advance of rendering the mediated reality content in dependence upon the wireless charging parameter.

According to some but not necessarily all examples, the apparatus comprises means for preferentially downloading mediated reality content, relating to an artificial virtual object mapped to a portion of the real space that is less effective for charging, while the apparatus is at a portion of the real space that is more effective for charging.

According to some but not necessarily all examples, the apparatus comprises means for preferentially downloading mediated reality content relating to an artificial virtual object mapped to a portion of the real space based on one or more of:
effectiveness of the portion of the real space for charging,
likelihood of the mediated reality relating to the virtual object being rendered, and
expected energy consumption required for rendering the mediated reality relating to the virtual object.

According to various, but not necessarily all, embodiments there is provided
instructions that when run by one or more processors of an apparatus, enable the apparatus to: in dependence upon a wireless charging parameter associated with wireless charging of the apparatus, change a mapping between a real space and a virtual space to enable improvement of the wireless charging parameter, wherein the mapping between the real space and the virtual space controls six degrees of freedom, first person perspective mediated reality rendered to a user of the apparatus, wherein the mediated reality content rendered to the user is a virtual scene determined by a virtual point of view within a virtual space, and wherein a real point of view of the user, defined by a location and orientation of the apparatus in real space, determines, via the mapping the virtual point of view within the virtual space of the virtual user.

According to various, but not necessarily all, embodiments there is provided a method comprising: rendering six degrees of freedom, first person perspective mediated reality to a user of an apparatus, wherein mediated reality content rendered to the user is a virtual scene determined by a virtual point of view within a virtual space, and wherein a real point of view of the user, defined by a location and orientation of the user in real space, determines, via a first mapping the virtual point of view within the virtual space of the virtual user;
in dependence upon a wireless charging parameter associated with wireless charging of the apparatus, changing the first mapping between the real space and the virtual space to a second mapping between the real space and the virtual space that is different to the first mapping; and rendering six degrees of freedom, first person perspective mediated reality to the user of the apparatus, wherein mediated reality content rendered to the user is a virtual scene determined by a virtual point of view within the virtual space, and wherein a real point of view of the user, defined by a location and orientation of the user in real space, determines, via the second mapping the virtual point of view within the virtual space of the virtual user,
wherein the change in the first mapping to the second mapping improves wireless charging.

According to some but not necessarily all examples, the method comprises:
measuring a change in the location and orientation in real space of the user wearing a head-mounted device to determine at least a change in the real point of view of the user; and
rendering mediated reality content as a virtual scene determined by a virtual point of view that maps via the mapping to the real point of view of the user.

According to some but not necessarily all examples, a change in the wireless charging parameter has a correlation with a change in wireless charging or wherein a change in the wireless charging parameter has a correlation with a change in energy consumption from rendering without a corresponding change in wireless charging.

According to some but not necessarily all examples, the wireless charging parameter is a parameter indicative of a rate of wireless charging decreasing below a threshold, and/or
the wireless charging parameter is a parameter indicative that the apparatus is more than a threshold distance from a wireless charging station, and/or the wireless charging parameter is a parameter indicative of an occlusion between the apparatus and a wireless charging station.

According to some but not necessarily all examples, the method comprises measuring the wireless charging parameter.

According to some but not necessarily all examples, the virtual space comprises a plurality of artificial virtual objects, and wherein changing the mapping between the real space and the virtual space changes at least a portion of the mapping that maps at least a location in the virtual space of at least one artificial virtual object to a corresponding location in the real space to bring the corresponding location closer to a wireless charging station or to avoid an obstruction between the apparatus and a wireless charging station.

According to various, but not necessarily all, embodiments there is provided examples as claimed in the appended claims.

BRIEF DESCRIPTION

Some examples will now be described with reference to the accompanying drawings in which:

FIG. 4B illustrates an example of a mediated reality rendering engine of an apparatus configured for rendering mediated reality;

FIG. 15 illustrates a method;

FIG. 16 illustrates a controller for the apparatus; and

FIG. 17 illustrates a computer program for the apparatus.

DEFINITIONS

Figure 1A:
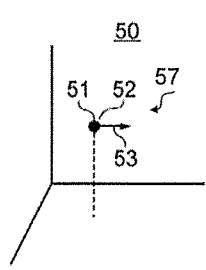
FIGS. 1A and 1B show an example, in a real space, of a change in a point of view of a user.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" (also referred to as extended reality) in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying (or rendering) the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed (rendered) by an apparatus to a user;

"virtual content" is content, additional to real content from a real scene, if any, that enables mediated reality by, for example, providing one or more artificial virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines, via a mapping between the virtual space and the real space, the point of view (virtual position) within the virtual space of a virtual user;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user, it includes displaying.

"virtual user" defines the point of view (virtual position—location and/or orientation) in virtual space used to generate a perspective-mediated sound scene and/or visual scene. A virtual user may be a notional listener and/or a notional viewer.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3 DoF) describes mediated reality where the virtual position is determined by orientation only (e.g. the three degrees of three-dimensional orientation). In relation to first person perspective-mediated reality, only the user's orientation determines the virtual position.

Six degrees of freedom (6 DoF) describes mediated reality where the virtual position is determined by both orientation (e.g. the three degrees of three-dimensional orientation) and location (e.g. the three degrees of three-dimensional location). In relation to first person perspective-mediated reality, both the user's orientation and the user's location in the real space determine, via a mapping between the virtual space and the real space the virtual position.

DETAILED DESCRIPTION

FIGS. 1A, 2A, 3A, 1B, 2B, 3B illustrate the rendering of mediated reality using mediated reality content. In this context, mediated reality means the rendering of mediated reality for the purposes of achieving mediated reality for example augmented reality or virtual reality. In these examples, the mediated reality is first person perspective-mediated reality. It may or may not be user interactive. It may be 3 DoF or 6 DoF.

Figure 2A:
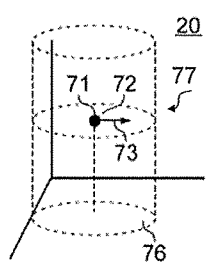
FIGS. 2A and 2B shows an example, in a virtual sound space, of a corresponding change in a point of view of a virtual user.
Figure 3A:
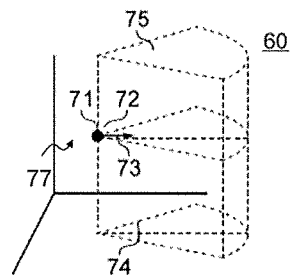
FIGS. 3A and 3B show an example, in a virtual visual space, of a corresponding change in the point of view of the virtual user.

FIGS. 1A, 2A, 3A illustrate at a first time a real space 50, a virtual sound space 20 and a virtual visual space 60. There is correspondence between the virtual sound space 20 and the virtual visual space 60.

A user 51 in the real space 50 has a real position (real point of view 57) defined by a location 52 and an orientation 53 in the real space 50. The location 52 is a three-dimensional location and the orientation is a three-dimensional orientation.

A virtual user 71 in the virtual space 20, 60 has a virtual position (virtual point of view 77) defined by a virtual location 72 and a virtual orientation 73. The virtual location 72 is a three-dimensional location and the virtual orientation 73 is a three-dimensional orientation.

There is a mapping between the virtual space 20, 60 and the real space 50. A real point of view 57, in the real space 50, defined by a location 52 and an orientation 53 in the real space 50 is mapped to a virtual point of view 77, in the virtual space 20, 60, defined by a virtual location 72 and a virtual orientation 73 in the virtual space 20, 60.

In 3 DoF mediated reality, an orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user 51. A virtual sound scene 76 is that part of the virtual sound space 20 that is rendered to a user. The virtual sound space 20 and the virtual visual space 60 correspond in that a position within the virtual sound space 20 has an equivalent position within the virtual visual space 60. In 3 DOF mediated reality, a change in the location 52 of the user 51 does not change the virtual location 72 or virtual orientation 73 of the virtual user 71.

In the example of 6 DoF mediated reality, the situation is as described for 3 DoF and in addition it is possible to change the rendered virtual sound scene 76 and the displayed virtual visual scene 75 by movement of a location 52 of the user 51 in the real space 50. For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered virtual sound scene 76 and also changes the rendered virtual visual scene 75.

Figure 1B:
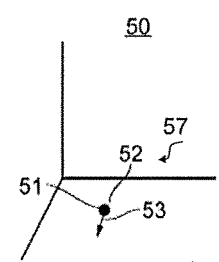
Figure 2B:
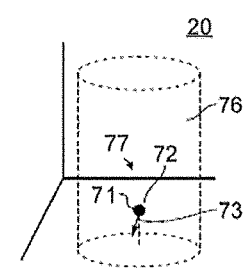
Figure 3B:
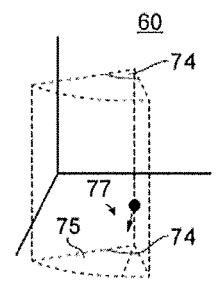

This may be appreciated from FIGS. 1B, 2B and 3B which illustrate the consequences of a change in location 52 and orientation 53 of the user 51 on respectively the rendered virtual sound scene 76 (FIG. 2B) and the rendered virtual visual scene 75 (FIG. 3B).

Figure 4A:
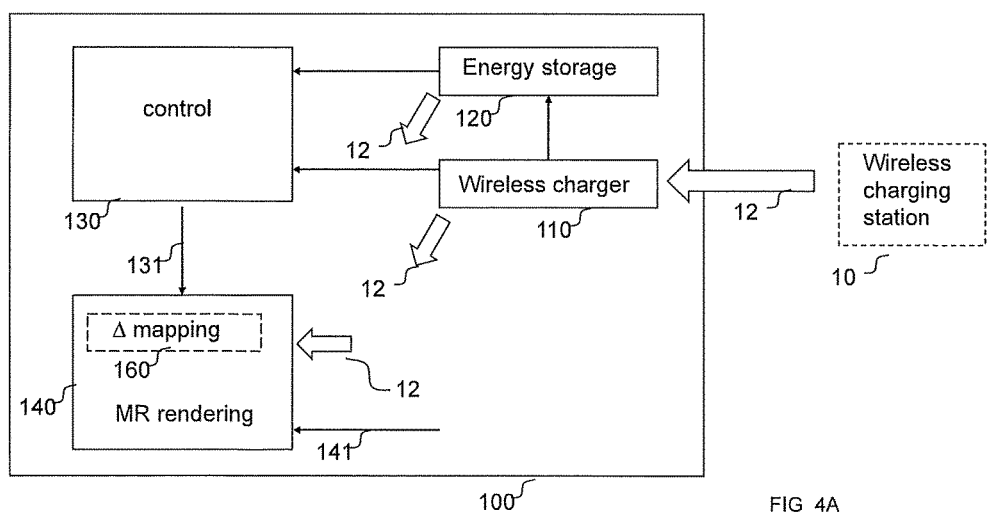
FIG. 4A illustrates an example of an apparatus configured for rendering mediated reality.

FIG. 4A illustrates an example of an apparatus 100 for mediated reality that is wirelessly charged.

The apparatus 10 comprises:

means 110 for wireless charging an energy storage device 120 comprised in the apparatus 100;

means 140 for using energy 12 from wireless charging and/or the energy storage device 120 to render mediated reality content 141 to a user 51 of the apparatus 100, wherein the mediated reality content rendered to the user is a virtual scene 75, 76 determined by a virtual point of view 77 within a virtual space 20, 60, wherein a real point of view 57 of the user 51, defined by a location 52 and orientation 53 of the user 51 in real space 50, determines, via a mapping 160 between the virtual space 20, 60 and the real space 50, the virtual point of view 77 within the virtual space 20, 60 of the virtual user 71; and means 140 for, in dependence upon a wireless charging parameter 131, changing the mapping 160 between the real space 50 and the virtual space 20, 60 to enable improvement of the wireless charging parameter 131.

Improvement of wireless charging improves the wireless charging parameter 131.

The means 140 is configured to, in dependence upon a wireless charging parameter 131, change the mapping 160 between the real space 50 and the virtual space 20, 60 to enable improvement of the wireless charging.

The apparatus 100 comprises an energy storage device 120. The energy storage device 120 can be a rechargeable battery (one or more cells). In at least some examples, the energy storage device 120 is relatively light with a relatively low energy capacity. This is possible because the energy storage device 120 can be re-charged during use of the apparatus 10 via wireless charging.

The apparatus 100 comprises a wireless charger 110 configured to wirelessly charge the energy storage device 120. The wireless charger 110 can be any suitable wireless charger that can be wirelessly charged by one or more wireless charging stations 10 that are separate from the apparatus 100. In at least some examples, the wireless charging station 10 can be used to charge the energy storage device 120 of the apparatus 100 while the wireless charger 110 of the apparatus 100 and the wireless charging station 10 are reasonably close to each other, for example, within 10 m or within 5 m or within 3 m.

Wireless charging enables energy 12 to be transferred from the wireless charging station 10 to the apparatus 100 without the use of wires or other physical connections. Wireless charging transfers electromagnetic energy 12 from the wireless charging station 10 to the apparatus 100.

The energy transfer can, in some examples, be achieved via inductive coupling or resonant inductive coupling. The energy transfer can, in some examples, be achieved via directed transmission of electromagnetic waves, for example beamformed transmission and/or reception of radio waves.

The wireless charger 110 can comprise a receiver for receiving transferred electromagnetic energy 12.

The energy 12 from wireless charger 110 and/or from the energy storage device 120 can be used by the apparatus 100 to perform its functions and, for example, to render mediated reality content 141 to a user 51 of the apparatus 100.

A mediated reality rendering engine 140 is configured to render mediated reality content 141 to a user 51 of the apparatus 100, and it receives energy 12 from wireless charger 110 and/or from the energy storage device 120.

The mediated reality content rendered to the user 51 by the mediated reality rendering engine 140 is a virtual scene 75, 76 determined by a virtual point of view 77 within a virtual space 20, 60 of a virtual user 71. The virtual point of view 77 of the virtual user 71 is defined by a virtual location 72 and virtual orientation 73 of the virtual user 71 in the virtual space 20, 60. The mediated reality is first-person perspective and the virtual point of view 77 of the virtual user 71 changes in correspondence with changes in the real point of view 57 of the user 51. The mediated reality has six degrees of freedom and the real point of view 57 of the user 51 is defined by a location 52 and orientation 53 of the user 51 in real space 50. Thus, the location 52 of the user 51 in real space 50 controls the virtual location 72 of the virtual user 71 in virtual space 20, 60 and the orientation 53 of the user 51 in real space 50 controls the virtual orientation 73 of the virtual user 71 in virtual space 20, 60.

A mapping 160 is used to convert the location 52 of the user 51 in real space 50 to the virtual location 72 of the virtual user 71 in virtual space 20, 60 and the orientation 53 of the user 51 in real space 50 to the virtual orientation 73 of the virtual user 71 in virtual space 20, 60.

A mediated reality rendering engine 140 is configured to determine, via the mapping 160 between the virtual space 20, 60 and the real space 50, the virtual point of view 77 within the virtual space 20, 60 of the virtual user 71.

The mapping 160 can, for example, control how the virtual space 20, 60 is oriented relative to the real space 50. Thus 'north' or another bearing in real space 50 can be mapped to a different bearing in the virtual space 20, 60 and vice versa.

The mapping 160 can, for example, control how the virtual space 20, 60 is sized relative to the real space 50. Thus, a change in location 52 in the real space 50 can be mapped to the same change in virtual location 72 in the virtual space 20, 60 or a different change in virtual location 72 in the virtual space 20, 60. Thus, a change in location 52 in the real space 50 can be mapped via a linear scaling factor to a change in virtual location 72 in the virtual space 20, 60.

The mapping 160 can, in some but not necessarily all examples, control how individual artificial virtual objects 78 in the virtual space 20, 60 are located relative to the real space 50 (and each other).

The mapping 160 can, for example, be changed to re-orient the virtual space 20, 60 relative to the real space 50 and/or rescale a change in location 52 in the real space 50 to a change in virtual location 72 in the virtual space 20, 60 and/or relocate artificial virtual objects 78 in the virtual space 20, 60 relative to the real space 50 (and each other).

The apparatus 100 comprises a control block 130 for producing a wireless charging parameter 131 that is used by the mediated reality rendering engine 140 to change the mapping 160 used for rendering mediated reality.

The mediated reality rendering engine 140 is configured to change the mapping 160 used for rendering mediated reality in dependence upon the wireless charging parameter 131. The change in the mapping 160 improves wireless charging with an associated improvement in the wireless charging parameter 131.

FIG. 4B illustrates an example of the mediated reality rendering engine 140.

The real point of view engine 148 is configured to receive input from location and orientation sensors which can be comprised in the apparatus 100. For example, accelerometers can be used to provide measurements that can be used to calculate changes in location 52 in different directions. For example, an electronic gyroscope or magnetometer can be used to provide measurements that can be used to calculate changes in orientation 53. The current location 52 and orientation 53 are provided as a current real point of view 57.

An interface 143 is provided for receiving the wireless charging parameter 131. The wireless charging parameter 131 is provided to a mapping engine 142 which is used to manage the mapping 160 used for mediated reality. The mapping engine 142 is configured to change the mapping 160 used for rendering mediated reality in dependence upon the wireless charging parameter 131. The change in the mapping 160 improves wireless charging with an associated improvement in the wireless charging parameter 131.

The real point of view 57, the (possibly updated) mapping 160 and the mediated reality content 141 are provided to the virtual scene engine 144.

In some but not necessarily all examples, the mediated reality content 141 is wirelessly transferred to the apparatus 100 via a wireless receiver 149. The wireless receiver 149 can be part of a wireless transceiver comprising a wireless receiver 149 and a wireless transmitter. In some but not necessarily all examples, the source transmitting the mediated reality content 141 is located at the wireless charging station 10.

The virtual scene engine 144 is configured to determine the virtual point of view 77 within a virtual space 20, 60 of a virtual user 71 using the received real point of view 57 and the received current mapping 160. The virtual point of view 77 of the virtual user 71 is defined by a virtual location 72 and virtual orientation 73 of the virtual user 71 in the virtual space 20, 60.

Changes in the real point of view 57 are mapped via the mapping 160 to changes in the virtual point of view 77 of the virtual user 71 in virtual space 20, 60. Thus, changes in the orientation 53 of the user 51 in real space 50 are mapped via the mapping 160 to changes in the virtual orientation 73 of the virtual user 71 in virtual space 20, 60 and/or changes in location 52 of the user 51 in real space 50 are mapped via the mapping 160 to changes in the virtual location 72 of the virtual user 71 in virtual space 20, 60.

The virtual point of view 77 of the virtual user 71 selects the virtual scene 75, 76 to be rendered to the user 51. The virtual scene 75, 76 is determined by a virtual point of view 77 within a virtual space 20, 60 of a virtual user 71.

The selected virtual scene 75, 76 is provided to the rendering device 145 where it is rendered to the user 51.

The selected virtual visual scene 75 is displayed to the user 51 via the user output interface 146 which comprises a visual output device or devices 147B. The visual output device 147B can, in some but not necessarily all examples, be a display such as a liquid crystal or organic light emitting diode display. The visual output device 147B can, in some but not necessarily all examples, be a head-mounted device.

The selected virtual sound scene 76 is rendered to the user 51 via the user output interface 146 which comprises an audio output device or devices 147A. The audio output device can, in some but not necessarily all examples, be a loudspeaker or other audio transducer.

While the mediated reality rendering engine 140 is illustrated as a series of distinct components 149, 148, 143, 142, 144, 146, this is only for the purposes of description. The different blocks 149, 148, 143, 142, 144, 146 can be arranged within any number of different components or spread across any number of different components. The components 149, 148, 143, 142, 144, 146 can be implemented in software, hardware or some combination of hardware and software.

Figure 5:
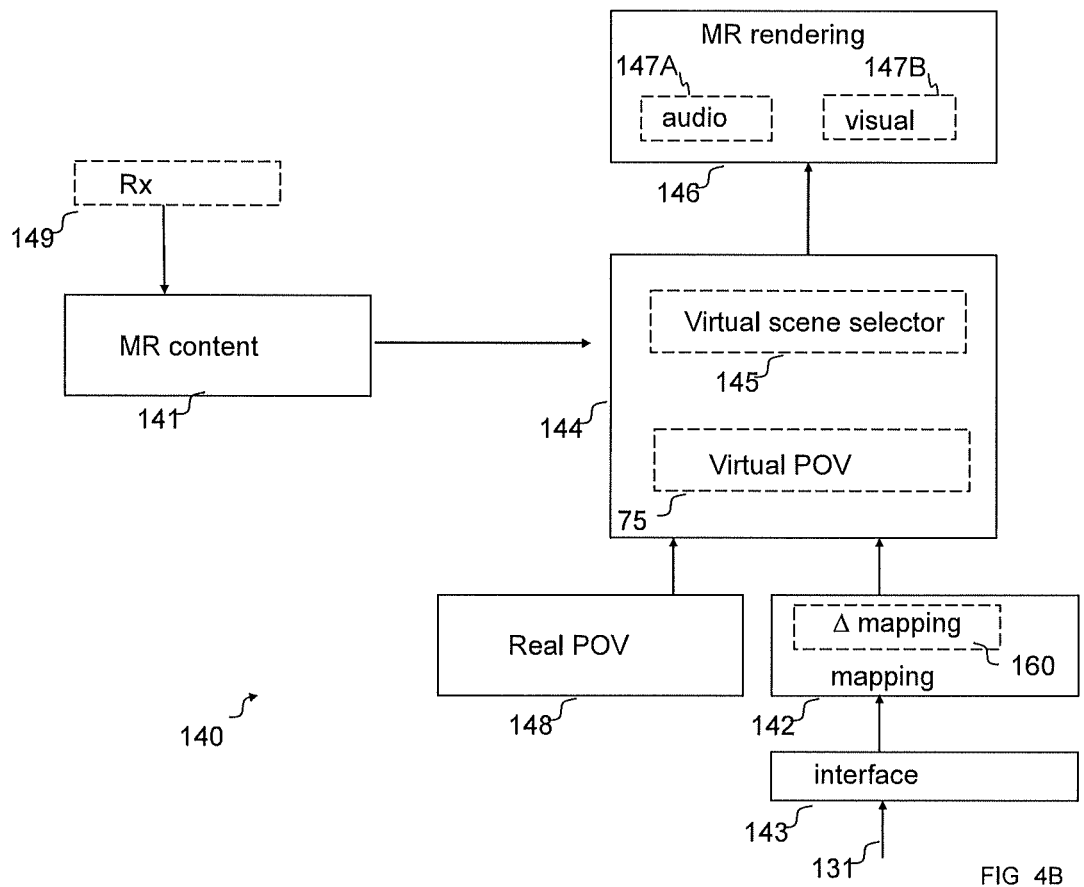
FIG. 5 illustrates an example of the apparatus configured as a head-mounted device for rendering mediated reality.
Figure 5:
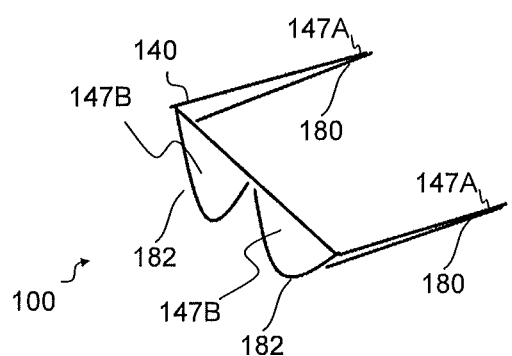

FIG. 5 illustrates an example of the apparatus 100. In this example, but not necessarily all examples, the apparatus 100 is a head-mounted device (HMD).

The head-mounted device (HMD) 100 has housing portions 180, 182. In use, the housing portion 180 is adjacent an ear of a user and the housing portion 182 is adjacent an eye of a user 51. The housing portion 180 adjacent the ear supports an audio output device 147A. The housing portion 182 adjacent the eye supports a visual output device 147B.

In this example, the head-mounted device (HMD) has a housing having a shape of glasses or goggles. In use, a different housing portion 180 is adjacent each ear of the user 51 and the housing portion 182 adjacent each eye of a user 51. Each of the two housing portions 180 adjacent an ear supports an audio output device 147A. Each of the two housing portions 182 adjacent an eye supports a visual output device 147B.

The audio output device 147A can be an audio transducer or a loudspeaker. The visual output device 147B can be a display. The display can be a see-through display or can be an opaque display that cannot be seen through.

The head-mounted device (HMD) 100 can also comprises the wireless charger 110 (not illustrated), the energy storage device 120 (not illustrated), the control block 130 (not illustrated) and the mediated reality rendering engine 140.

The mediated reality rendering engine 140 is configured to measure a change in the location 52 and orientation 53 in the real space 50 of a user 51 wearing the head-mounted device 100 to determine at least a change in the real point of view 57 of the user 51 and is configured to render mediated reality content 141 as a virtual scene 75, 76 determined by a virtual point of view 57 that maps via the mapping 160 to the real point of view 57 of the user 51.

In FIG. 6A, 6B, 6C, 7A, 7B, 7C the apparatus 100 is a distance D from the wireless charging station 10.

Energy transferred 152 is illustrated in FIG. 6A, 6B, 6C, 7A, 7B, 7C. The energy transferred 152 can either be used (consumed) or stored in the energy storage device 120.

Figure 6A:
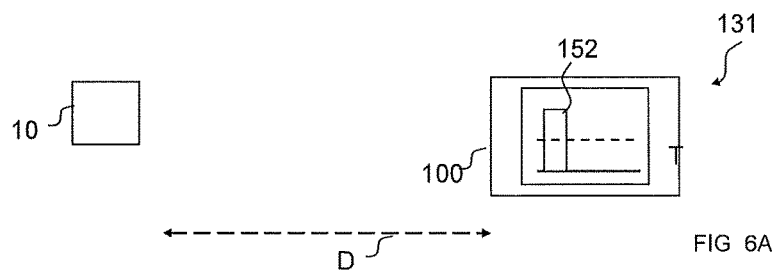
FIGS. 6A, 6B, 6C, 7A, 7B, 7C illustrate different scenarios that affect a wireless charging parameter.
Figure 6B:
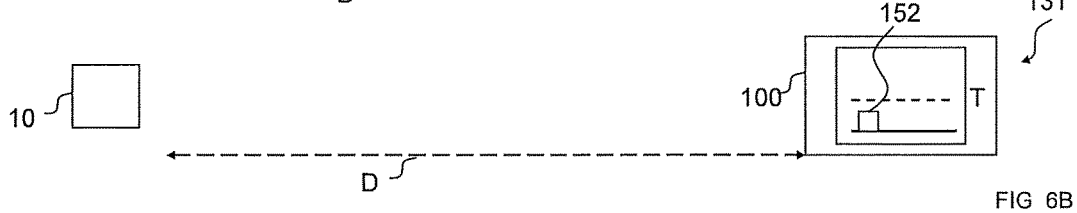

As illustrated in FIGS. 6A and 6B, in some but not necessarily all examples, the energy transferred 152 is dependent upon a distance D of the apparatus 100 from the wireless charging station 10. When the distance D is increased (FIG. 6B) the rate of energy transfer and the energy transferred 152 decreases. When the distance D is decreased (FIG. 6A) the rate of energy transfer and the energy transferred 152 increases.

The distance D can be used as the wireless charging parameter 131. When the distance D exceeds a threshold, the apparatus 100 is configured to change the mapping 160 between the real space 50 and the virtual space 20, 60 to enable improvement of the rate of energy transfer or the energy transferred 152. The mapping is changed to enable a reduction in the distance D between the apparatus 100 and the wireless charging station 10. Thus, the mapping 160 is changed, in dependence upon a wireless charging parameter 131, to cause improvement of the wireless charging parameter 131.

The rate of energy transfer or the energy transferred 152 can be used as the wireless charging parameter 131. When the rate of energy transfer or the energy transferred 152 falls below a threshold T, the apparatus 100 is configured to change the mapping 160 between the real space 50 and the virtual space 20, 60 to enable improvement of the rate of energy transfer or the energy transferred 152. The mapping is changed to enable a reduction in the distance D between the apparatus 100 and the wireless charging station 10. Thus, the mapping 160 is changed, in dependence upon a wireless charging parameter 131, to cause improvement of the wireless charging parameter 131.

Figure 6C:
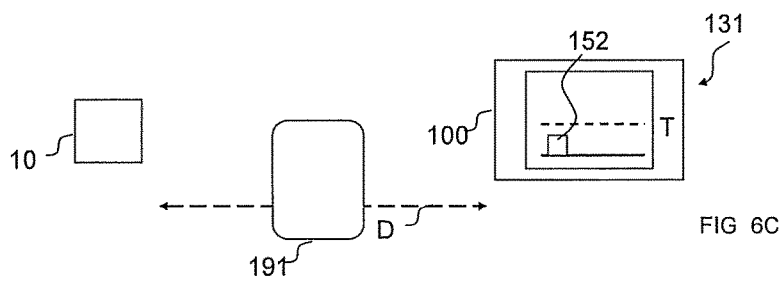

As illustrated in FIGS. 6A and 6C, in some but not necessarily all examples, the energy transferred 152 is dependent upon whether or not there is an obstruction 191 between the apparatus 100 and the wireless charging station 10. When an obstruction 191 is present (FIG. 6C) the rate of energy transfer and the energy transferred 152 decreases. When the obstruction 191 is wholly or partially removed (FIG. 6A) the rate of energy transfer and the energy transferred 152 increases.

The rate of energy transfer or the energy transferred 152 can be used the wireless charging parameter 131. When the rate of energy transfer or the energy transferred 152 falls below a threshold T, the apparatus 100 is configured to change the mapping 160 between the real space 50 and the virtual space 20, 60 to enable improvement of the rate of energy transfer or the energy transferred 152.

For example, the mapping 160 can be changed to enable removal of the obstruction 191 between the apparatus 100 and the wireless charging station 10. For example, the mapping 160 is changed so that a user is more likely to locate the apparatus 100 at line-of-sight locations than obstructed locations.

Figure 9:
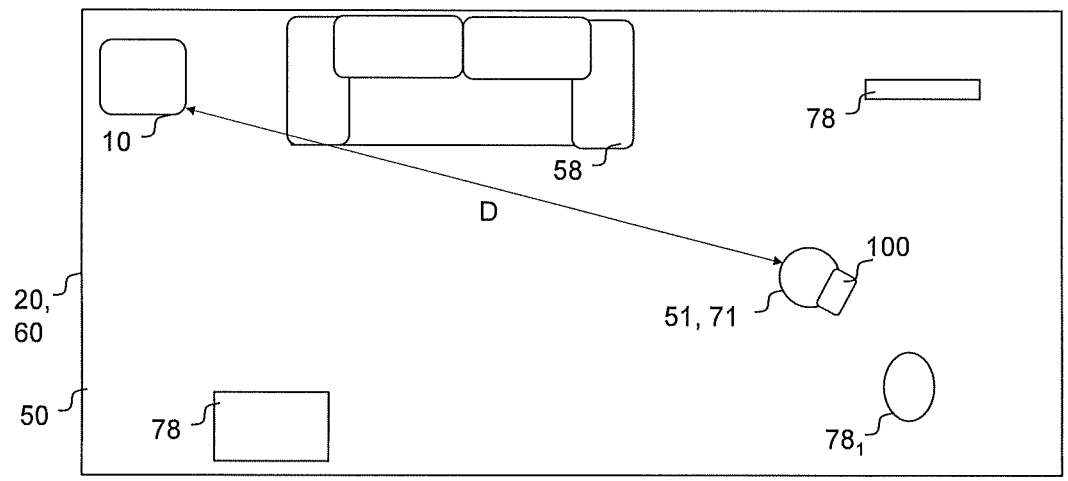
FIGS. 9, 10 illustrate limitations arising from a first correspondence mapping between the real space and the virtual space.
Figure 11:
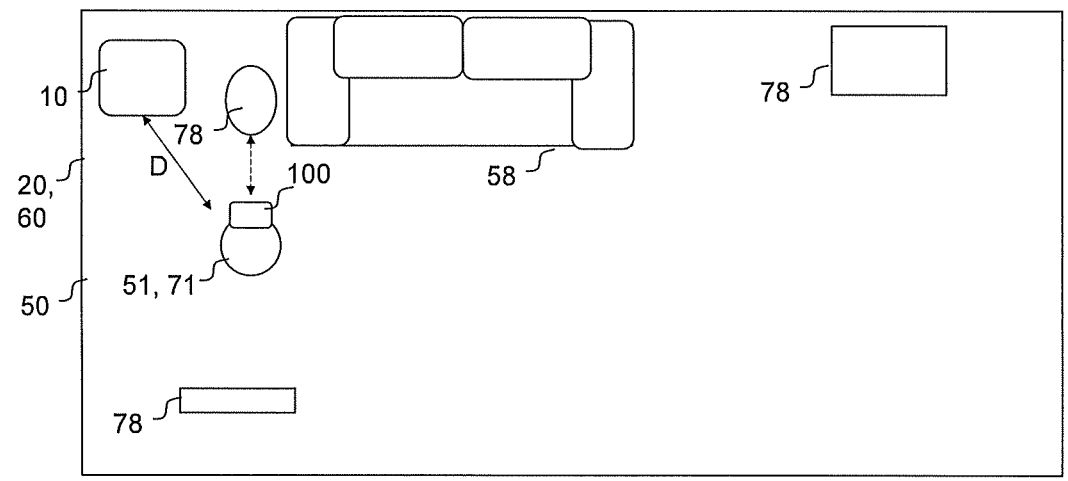
FIGS. 11, 12, 13 illustrate consequences of respective changes in the correspondence mapping between the real space and the virtual space.
Figure 12:
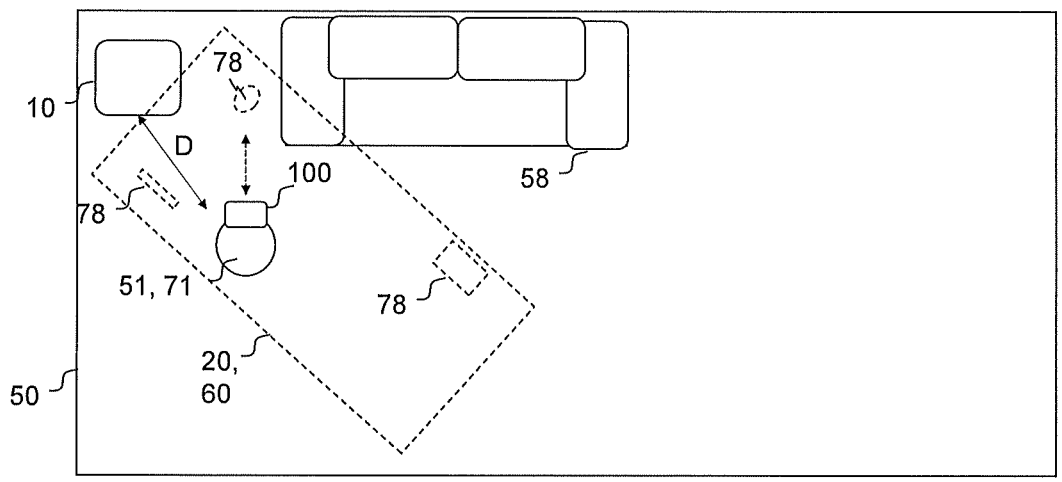
Figure 13:
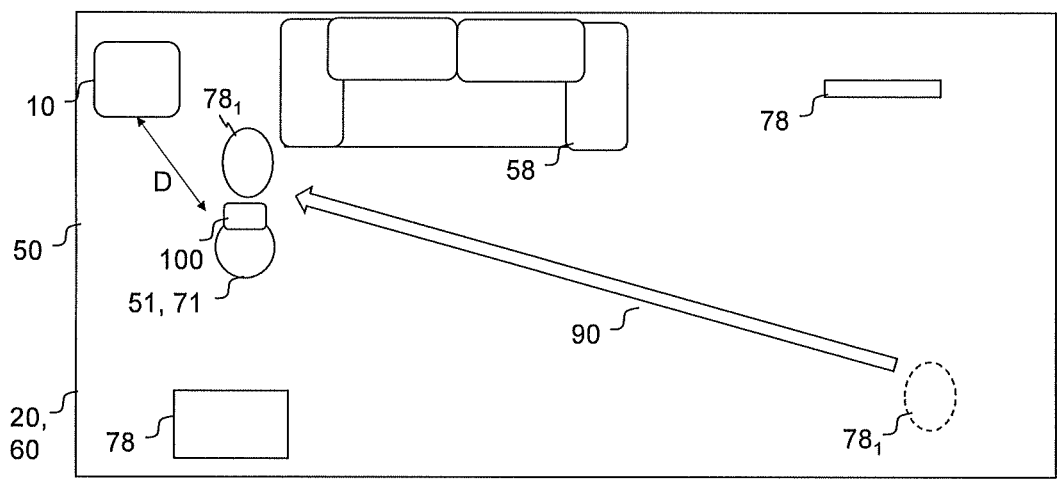

This can be achieved by, for example, moving one or more artificial virtual objects 78 to locations in the virtual space 20, 60 that correspond to line-of-sight locations in the real space 50 (e.g. compare FIG. 9 with FIG. 11 or 12 or 13). Obstructed locations are locations in the real space that are blocked from the wireless charging station 10 by the obstruction 191. Line-of-sight locations are locations in the real space 50 that are in line-of-sight of the wireless charging station 10 and are not blocked from the wireless charging station 10 by the obstruction 191.

Thus, the mapping 160 is changed, in dependence upon a wireless charging parameter 131, to cause improvement of the wireless charging parameter 131.

Figure 7A:
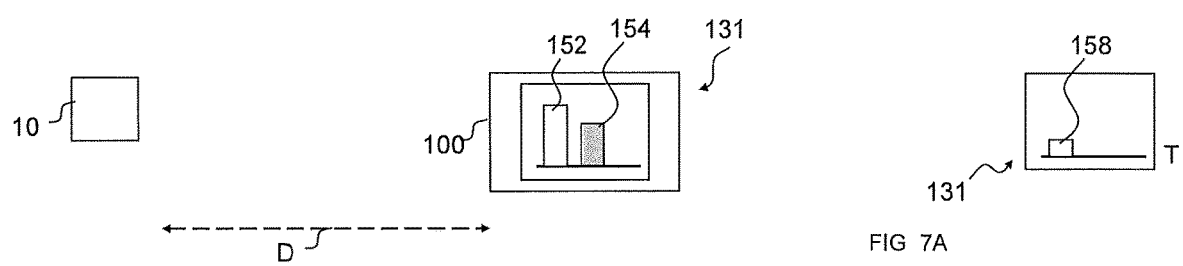
Figure 7B:
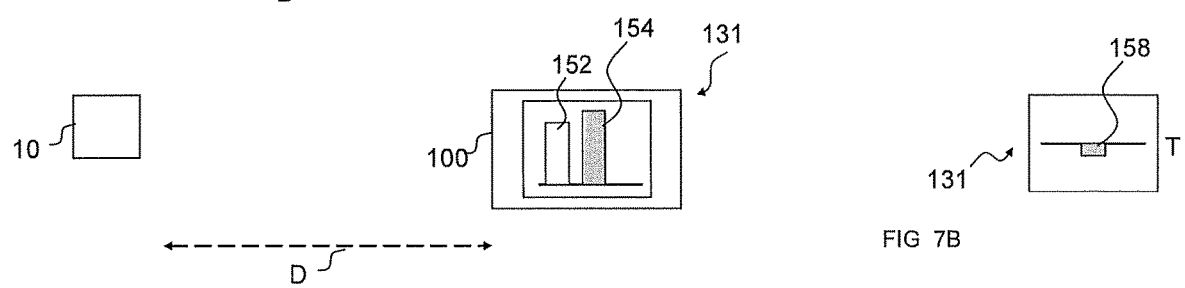
Figure 7C:

As illustrated in FIG. 7A, 7B, 7C energy transferred 152 can either be used (consumed) or stored in the energy storage device 120.

Energy consumed 154 is illustrated in FIGS. 7A, 7B, 7C. This is the energy used by the apparatus, for example the energy used to render mediated reality content 141 to a user 51 of the apparatus 100.

The energy transferred 152 can be variable. It can for example be dependent upon a distance D of the apparatus 100 from the wireless charging station 10 and/or the presence of obstructions 191 between the apparatus 100 and the wireless charging station 10.

The energy consumed 154 can be variable. It can for example be dependent upon the processing required to render mediated reality content 141 to the user 51. The mediated reality content 141 rendered to the user is a virtual scene 75, 76 determined by the virtual point of view 77 within the virtual space 20, 60 which depends upon the real point of view 57 within the real space 50.

The energy consumed 154 can depend upon the virtual scene 75, 76. For example, the apparatus 100 can consume more energy to render a larger number of artificial virtual objects 78 (see FIG. 8B). For example, the apparatus 100 can consume more energy to render more complex or process-intensive artificial virtual objects 78 (see FIG. 8B).

The mediated reality content 141 can evolve and vary over time. Therefore, that part of the mediated reality content 141 that is rendered to the user 51 can vary in time.

Therefore, at any moment in time the mediated reality content 141 can be changing because it is evolving over time and/or because the virtual point of view 77 is changing causing a change in the virtual scene 75,76 and which artificial virtual objects 78 are within the virtual scene 75, 76.

The mediated reality content 141 that is rendered to the user 51 can therefore vary in time and/or space (real and virtual) at any moment in time. Consequently, it is possible for the energy consumed 154 to vary in time and/or space (real and virtual) at any moment in time.

When the energy consumed 154 is increased (FIG. 7B, compared to FIG. 7A) the net rate of energy transfer and the net energy transferred 158 decreases. In FIG. 7B, the energy consumed 154 is greater than the energy transferred 152 and the net energy transferred (energy transferred 152 minus energy consumed 154) is negative.

When the energy consumed 154 is decreased (FIG. 7A, compared to FIG. 7B) the net rate of energy transfer and the net energy transferred 158 increases. In FIG. 7B, the energy consumed 154 is less than the energy transferred 152 and the net energy transferred (energy transferred 152 minus energy consumed 154) is positive.

The rate of energy transfer or the energy transferred 152, the rate of energy consumed transfer or the energy consumed 154, or some combination of these parameters, such as the rate of net energy transfer or the net energy transferred 158 can be used the wireless charging parameter 131.

For example, when the rate of net energy transfer or the net energy transferred 158 falls below a threshold T, the apparatus 100 can be configured to change the mapping 160 between the real space 50 and the virtual space 20, 60 to enable improvement of the rate of net energy transfer or the net energy transferred 152. The mapping is changed to enable a reduction in the energy consumed 154. Thus, the mapping 160 is changed, in dependence upon a wireless charging parameter 131, to cause improvement of the wireless charging parameter 131 (e.g., FIG. 7B to FIG. 7A).

As illustrated in FIG. 7C the net energy transferred 158 is also dependent not only a change in energy consumed 154 (compare FIG. 7A, 7B) but also on a change in energy transferred 152 (compare FIG. 7A, 7C). Between FIG. 7A and FIG. 7B, the energy consumed 154 is varied and the energy transferred 152 is constant to illustrate the effects, on the net energy transferred 158, of varying the energy consumed 154. Between FIG. 7A and FIG. 7C, the energy consumed 154 is constant and the energy transferred 152 is varied to illustrate the effects, on the net energy transferred 158, of varying the energy transferred 152. Between FIGS. 7B and FIG. 7C, the net energy transferred 158 varies because both the energy consumed 154 and the energy transferred 152 vary.

A change in the wireless charging parameter 131 can have a correlation with a change in wireless charging e.g., energy transferred 152 (FIGS. 6A-C, 7A-C). The change in the wireless charging parameter 131 can have a correlation with only a change in wireless charging e.g., energy transferred 152 (FIGS. 6A-6C, FIG. 7A↔7C) or with wireless charging e.g., energy transferred 152 and some other parameter e.g., energy consumed 154 (FIG. 7B↔7C). In some examples, a change in the wireless charging parameter 131 has a correlation with a change in energy consumption from rendering e.g. energy consumed 154 without a corresponding change in wireless charging e.g. energy transferred 152 (FIG. 7A↔7B.

The wireless charging parameter 131 can be dependent on the amount or the rate of change in the amount of energy transferred 152. The wireless charging parameter 131 can be dependent on the amount or the rate of change in the amount of net energy transferred 158. The net energy transferred can be expressed as net energy stored (charging) or net energy consumed (charging). The wireless charging parameter 131 can be a parameter indicative of a rate of wireless charging decreasing below a threshold. The wireless charging parameter 131 can be a parameter indicative that the apparatus 100 is more than a threshold distance D from a wireless charging station 10. The wireless charging parameter can be a parameter indicative of an occlusion (obstruction) between the apparatus 100 and a wireless charging station 10.

The wireless charging parameter 131 can be measured parameter or dependent upon one or more measurements. For example, the wireless charging parameter 131 can be a current (real-time) measurement of, for example, the energy transferred 152 or the net energy transferred 158.

The wireless charging parameter 131 can be a calculated parameter. The calculated parameter can be dependent upon one or more measurements or independent of measurements. For example, the wireless charging parameter 131 can be an expected (future) value of the energy transferred 152 or the net energy transferred 158. In this example, the wireless charging parameter 131 can vary with an expectation that the energy transferred 152 will vary and/or that the energy consumed 154 will vary. The expectation that the energy transferred 152 will vary can, for example, be based upon an expectation that a distance D between the apparatus 100 and the wireless charging station 10 will vary and/or an expectation that an obstruction will be present between the apparatus 100 and the wireless charging station 10. The expectation that the energy consumed 154 will vary can, for example, be based upon an expectation of what mediated reality content 141 will be rendered to the user. This can be based on an expected real point of view of the user and/or the user's past history of consuming mediated reality content 141.

Figure 8A:
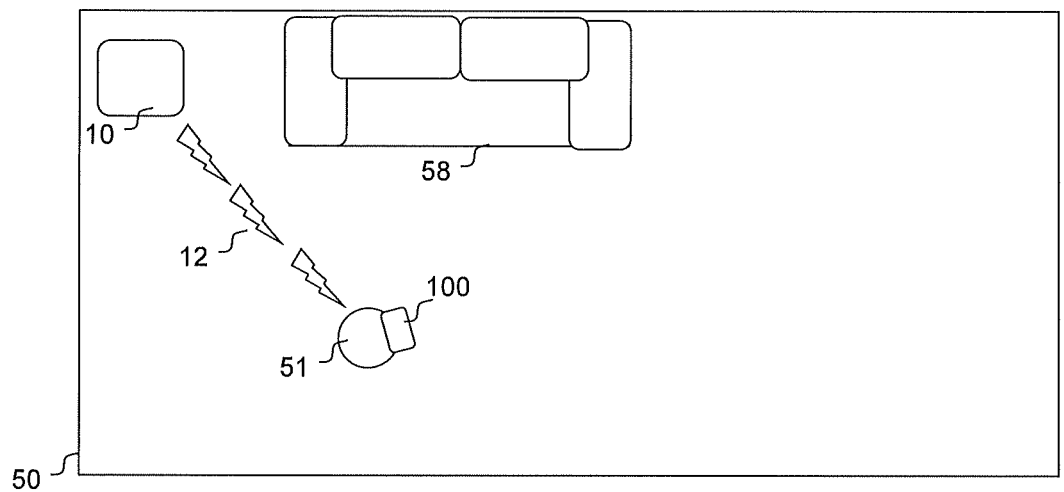
FIGS. 8A, 8B, 8C illustrate respectively a real space, a virtual space and a result of a correspondence mapping between the real space and the virtual space.

FIG. 8A illustrates an example of a real space 50 which will be used in the following examples. In this example, the real space 50 is a living space, for example, a room. The real space comprises a wireless charging station 10, although in other examples it could comprise multiple wireless charging stations 10. The user 51 is wearing the apparatus 100 as a head-mounted device. The apparatus 100 is wirelessly charged with energy 12 by the wireless charging station 10. The user 51 (with the apparatus 100) can move within the real space 50 changing the real point of view by changing location and/or orientation of the user 51(apparatus 100). The real space 50 can comprise real objects 58 which the user 51 can use and/or avoid depending upon circumstances.

Figure 8B:
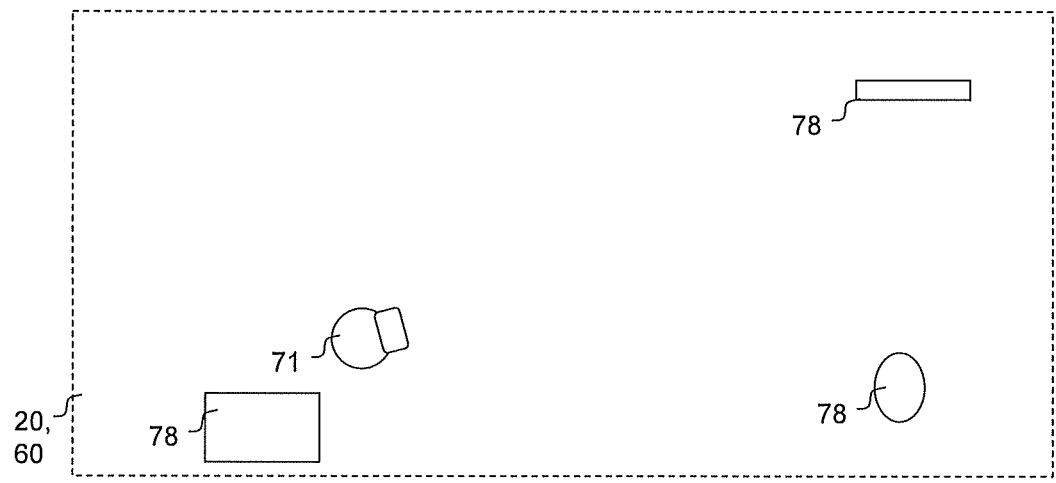

FIG. 8B illustrates an example of a virtual space 20, 60. The virtual space can be a virtual visual space 60, a virtual sound space 20 or a combination of a virtual visual space 60 and corresponding virtual sound space 20. The virtual user 71 can be moved within the real space 50 changing its virtual point of view by changing its location and/or orientation.

The virtual space 20, 60 comprises rendered mediated reality content 141 which can comprise artificial virtual objects 78. This can be virtual visual objects and/or sound objects. The changes in the virtual point of view (location and orientation) correspond to changes in the real point of view of the user 51 in FIG. 8A.

Figure 8C:
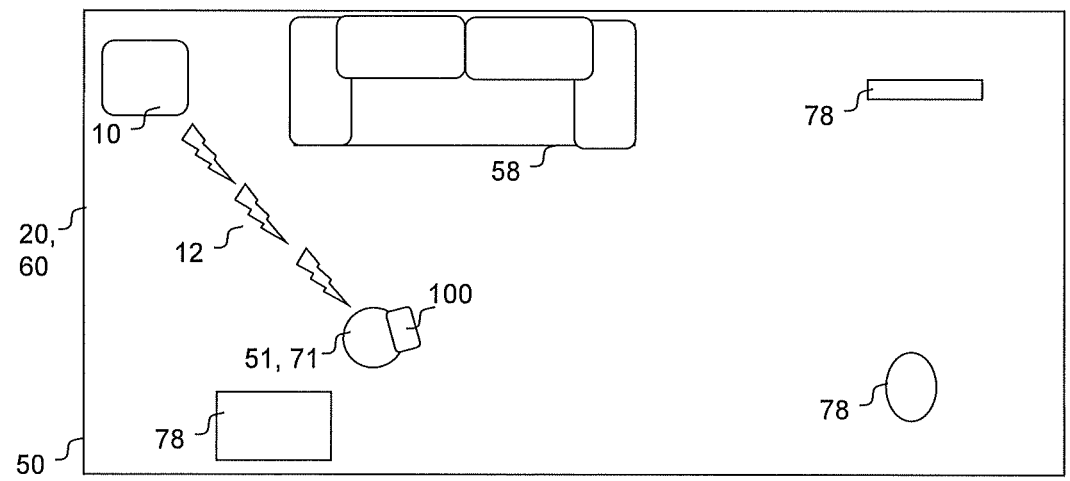

FIG. 8C illustrates a mapping 160 between the real space 50 and the virtual space 20, 60. The mapping 160 defines the correspondence between the real space 50 and the virtual space 20, 60. In FIG. 8C the correspondence is illustrated by overlaying the real space 50 and the virtual space 20, 60. The perimeter of the real space 50 (solid line in FIG. 8A) and the perimeter of the virtual space 20, 60 (dotted line in FIG. 8B) overlap. However, this is not necessarily the case (see FIG. 12).

In FIGS. 9-14 the correspondence between the real space 50 and the virtual space 20 is illustrated by overlaying the real space 50 and the virtual space 20, 60. The perimeter of the real space 50 has a solid line and the perimeter of the virtual space 20, 60 has a dotted line. Where the perimeters overlap only the solid line is visible. Where the perimeters do not overlap (FIG. 12) the dotted line and the solid line are visible.

The mapping 160 enables rendering six degrees of freedom, first person perspective mediated reality to the user 51 of an apparatus 100. As previously described, the mediated reality content 141 rendered to the user 51 is a virtual scene 75, 76 determined by a virtual point of view 77 within the virtual space 20, 60. The real point of view 57 of the user 51 determines, via the mapping 160 the virtual point of view 77 within the virtual space 20, 60 of the virtual user 71. The real location 52 of the user 51 in the real space 50 determines, via the mapping 160, the virtual location 72 of the virtual user 71 in the virtual space 20, 60. The real orientation 53 of the user 51 in the real space 50 determines, via the mapping 160, the virtual orientation 73 of the virtual user 71 in the virtual space 20, 60.

Figure 10:
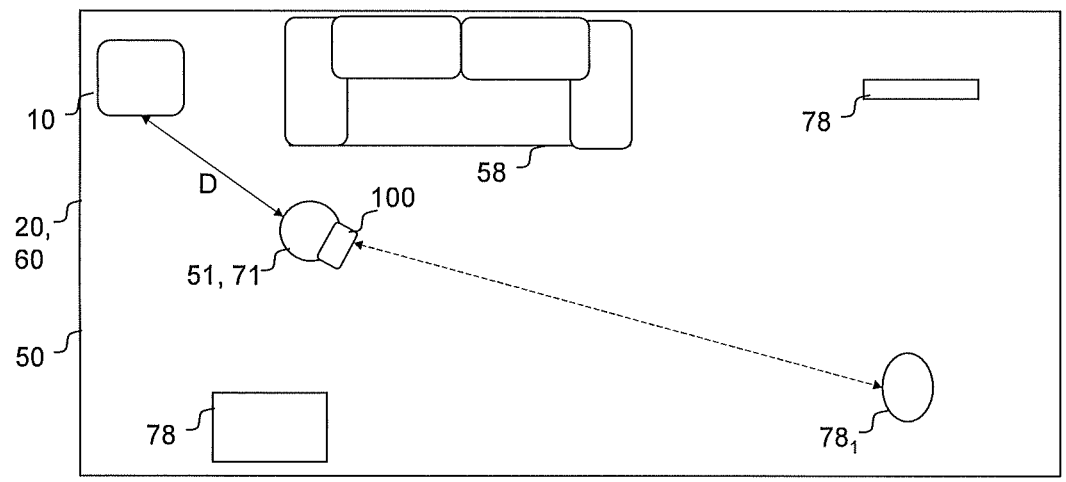

In FIGS. 9 and 10 there is a first mapping between the real space 50 and the virtual space 20, 60. As illustrated in FIG. 9, when the virtual user 71 is adjacent a target artificial virtual object $78_1$, the distance D between the user 51 (and the apparatus 100) and the wireless charging station 10 is large. As illustrated in FIG. 9, the virtual user 71 cannot be adjacent the target artificial virtual object $78_1$, when the distance D between the user 51 (and the apparatus 100) and the wireless charging station 10 is smaller. The wireless charging parameter 131 associated with wireless charging of the apparatus 100 can indicate that charging, when accessing the target artificial virtual object $78_1$, can be improved by changing the mapping 160.

The apparatus 100, in dependence upon the wireless charging parameter 131 associated with wireless charging of the apparatus 100, changes the first mapping (FIGS. 9, 10) between the real space 50 and the virtual space 20, 60 to a second mapping (FIG. 11) between the real space 50 and the virtual space 20, 60 that is different to the first mapping. The apparatus 100 then renders six degrees of freedom, first person perspective mediated reality to the user 51 of the apparatus 100 using the second mapping (FIG. 11). The change in the first mapping to the second mapping improves wireless charging when accessing the target artificial virtual object $78_1$.

The second mapping maps the virtual location of the target artificial virtual object $78_1$ to a real location, in the real space 50, that is closer to the real location, in the real space 50, of the wireless charging station 10.

The second mapping maps the virtual location of the target artificial virtual object $78_1$ to a real location, in the real space 50, that allows it to be accessed from real access locations, in the real space, that have an unobstructed view of the wireless charging station 10.

The second mapping can rotate the virtual space 20, 60 through an angle θ compared to the first mapping. In the example of FIG. 11, θ=180° and in the example of FIG. 12, θ~235°. All the artificial virtual objects 78 in the virtual space 20, 60 rotate with the virtual space 20, 60.

The second mapping can re-scale the virtual space 20, 60 compared to the first mapping. In the example of FIG. 11, there is no re-scaling. In the example of FIG. 12, there is a linear re-scaling that reduces the dimensions of the virtual space 20, 60 proportionally. The displacements between all of the artificial virtual objects 78 in the virtual space 20, 60 rotate with the virtual space 20, 60.

As illustrated in FIG. 13, the second mapping 160 can move 90 a particular artificial virtual object 78 (e.g. target artificial virtual object $78_1$) relative to other artificial virtual objects 78 in the virtual space 20, 60. The relative displacements between the moving 90 artificial virtual object $78_1$ and all of the other artificial virtual objects 78 in the virtual space 20, 60 changes whereas the relative displacements between all of the other artificial virtual objects 78 in the virtual space 20, 60 remains the same. The second mapping 160 can move 90 more than one artificial virtual object 78 (e.g. target artificial virtual object $78_1$) relative to other artificial virtual objects 78 in the virtual space 20, 60.

The second mapping can perform one or more of a rotation, translation and re-scaling (e.g. re-sizing) of the virtual space 20, 60 relative to the real space 50 and/or move one or more artificial virtual objects 78 relative to other artificial virtual objects 78 in the virtual space 20, 60.

The second mapping can modify the relationship of the rendered mediated reality content 141 to the real space 50 to enable improvement of the wireless charging parameter 131.

For example, as illustrated in FIG. 13, changing the mapping 160 between the real space 50 and the virtual space 20, 60 can change at least a portion of the mapping that maps at least a location in the virtual space 20, 60 of at least one artificial virtual object $78_1$ to a corresponding location in the real space 50 to bring the corresponding location closer to a wireless charging station 10.

The selection of the artificial virtual object $78_1$ can be based on actual or expected energy consumption e.g. energy consumed 154 associated with rendering the artificial virtual object $78_1$. For example, the artificial virtual object $78_1$ can be selected based on characteristics of the artificial virtual object $78_1$, for example, particular characteristics that require higher energy consumption for rendering. Thus, the artificial virtual object $78_1$ can be selected or more probably selected because it is a multichannel audio object. The selection of the artificial virtual object $78_1$ is thus biased by it characteristic, namely being a multichannel audio object.

The task of changing of the mapping from the first mapping to the second mapping can be defined as a constrained optimization problem. The optimization can be continually evaluated or evaluated based on a trigger such as elapsed time or a value of change in value of the wireless charging parameter 131.

The optimization problem can be specified, for example, as what spatial arrangement of the artificial virtual objects 78 (or a sub-set of the artificial virtual objects 78) will optimize charging while maintaining an acceptable user experience. Optimization of charging could, for example, be defined as maintaining the stored energy level above a minimum. Acceptable user experience could, for example, be defined as maximizing the usable size of the virtual space 20, 60. The expected energy consumption for rendering an artificial virtual object 78 can be defined as an object-based cost and the artificial virtual objects 78 can be spatially arranged so that the total object-based cost at any time does not deplete the stored energy, which is being replenished by wireless charging. Thus, changing the mapping 160 between the real space and the virtual space can comprise changing the mapping 160 of multiple artificial virtual objects 78 of the virtual space 20, 60 to the real space 50 to optimize the wireless charging parameter 131.

Figure 14:
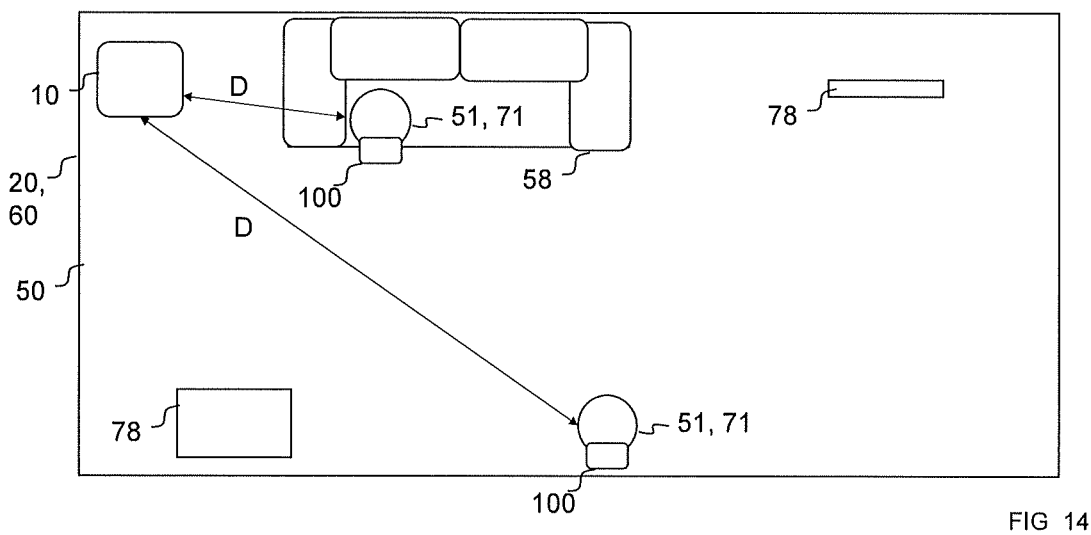
FIG. 14 illustrates pre-fetching of mediated reality content.

FIG. 14 illustrates an example of 'opportunistic' download.

The apparatus 100 is configured to control download of mediated reality content 141 to the apparatus 100 in advance of rendering the mediated reality content 141. The download can be controlled in dependence upon the wireless charging parameter 131.

The download of mediated reality content 141 can consume energy. It can therefore be desirable to download mediated reality content 141 when the energy transferred is large and\or the net energy transferred (before or during the download) is acceptable.

Thus, download of mediated reality content 141 can be increased when efficient charging is available and can be decreased when only inefficient charging is available.

The apparatus 100 can therefore be configured to preferentially download mediated reality content 141, relating to an artificial virtual object 78 mapped to a portion of the real space 50 that is less effective for charging, while the apparatus 100 is at a portion of the real space that is more effective for charging. The apparatus 100 anticipates that charging will be relatively poor when it is desired to render the mediated reality content 141 and therefore downloads that mediated reality content 141 in advance, opportunistically, while charging is good. The download of mediated reality content 141 is therefore not necessarily in response to current demand (streaming) but depends upon the effectiveness of charging as measured by the wireless charging parameter 131.

The preferential download of mediated reality content 141 relating to an artificial virtual object 78 mapped to a portion of the real space 50 can, for example, be based on one or more of:

effectiveness of the portion of the real space for charging, likelihood of the mediated reality content 141 relating to the artificial virtual object 78 being rendered, and expected energy consumption required for rendering the mediated reality relating to the artificial virtual object 78.

FIG. 15 illustrates an example of a method 200.

At block 210, the method 200 comprises rendering six degrees of freedom, first person perspective mediated reality to a user of an apparatus, wherein mediated reality content rendered to the user is a virtual scene determined by a virtual point of view within a virtual space, and wherein a real point of view of the user, defined by a location and orientation of the user in real space, determines, via a first mapping the virtual point of view within the virtual space of the virtual user.

At block 212, the method 200 comprises, in dependence upon a wireless charging parameter associated with wireless charging of the apparatus, changing the first mapping between the real space and the virtual space to a second mapping between the real space and the virtual space that is different to the first mapping.

At block 214, the method 200 comprises rendering six degrees of freedom, first person perspective mediated reality to the user of the apparatus, wherein mediated reality content 141 rendered to the user is a virtual scene determined by a virtual point of view within the virtual space, and wherein a real point of view of the user, defined by a location and orientation of the user in real space, determines, via the second mapping the virtual point of view within the virtual space of the virtual user.

The change from the first mapping to the second mapping improves wireless charging.

FIG. 16 illustrates an example of a controller 101 of the apparatus 100. Implementation of a controller 101 may be as controller circuitry. The controller 101 may be implemented in hardware alone, have certain aspects in software including firmware alone or can be a combination of hardware and software (including firmware).

The controller 101 can be used to provide the control block 130 and/or the mediated reality rendering engine 140 or parts thereof.

As illustrated in FIG. 16 the controller 101 may be implemented using instructions that enable hardware functionality, for example, by using executable instructions of a computer program 106 in a general-purpose or special-purpose processor 102 that may be stored on a computer readable storage medium (disk, memory etc) to be executed by such a processor 102.

The processor 102 is configured to read from and write to the memory 104. The processor 102 may also comprise an output interface via which data and/or commands are output by the processor 102 and an input interface via which data and/or commands are input to the processor 102.

The memory 104 stores a computer program 106 comprising computer program instructions (computer program code) that controls the operation of the apparatus 100 when loaded into the processor 102. The computer program instructions, of the computer program 106, provide the logic and routines that enables the apparatus to perform the methods illustrated in the FIGS. The processor 102 by reading the memory 104 is able to load and execute the computer program 106.

The apparatus 100 therefore comprises:
at least one processor 102; and
at least one memory 104 including computer program code
the at least one memory 104 and the computer program code configured to, with the at least one processor 102, cause the apparatus 100 at least to perform:
rendering six degrees of freedom, first person perspective mediated reality to a user of an apparatus, wherein mediated reality content 141 rendered to the user is a virtual scene 75, 76 determined by a virtual point of view 77 within a virtual space, and wherein a real point of view 57 of the user 51, defined by a location 52 and orientation 53 of the user 51 in real space 50, determines, via a first mapping 160 the virtual point of view 77 within the virtual space 20, 60 of the virtual user 71;
in dependence upon a wireless charging parameter 131 associated with wireless charging of the apparatus 100, changing the first mapping 160 between the real space 50 and the virtual space 20, 70 to a second mapping 160 between the real space 50 and the virtual space 20, 60 that is different to the first mapping 160; and
rendering six degrees of freedom, first person perspective mediated reality to the user 51 of the apparatus 100, wherein mediated reality content 141 rendered to the user 51 is a virtual scene 75, 76 determined by a virtual point of view 77 within the virtual space 20, 60, and wherein a real point of view 57 of the user 51, defined by a location 52 and orientation 53 of the user 51 in real space 50, determines, via the second mapping 160 the virtual point of view 77 within the virtual space 20, 60 of the virtual user 71. The change in the first mapping to the second mapping improves wireless charging.

As illustrated in FIG. 17, the computer program 106 may arrive at the apparatus 100 via any suitable delivery mechanism 108. The delivery mechanism 108 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 106. The delivery mechanism may be a signal configured to reliably transfer the computer program 106. The apparatus 100 may propagate or transmit the computer program 106 as a computer data signal.

Instructions such as computer program instructions that when run by one or more processors of an apparatus cause the apparatus to perform at least the following or for performing at least the following:

in dependence upon a wireless charging parameter associated with wireless charging of the apparatus, change a mapping between a real space and a virtual space to enable improvement of the wireless charging parameter, wherein the mapping between the real space and the virtual space controls six degrees of freedom, first person perspective mediated reality rendered to a user of the apparatus, wherein the mediated reality content rendered to the user is a virtual scene determined by a virtual point of view within a virtual space, and wherein a real point of view of the user, defined by a location and orientation of the apparatus in real space, determines, via the mapping the virtual point of view within the virtual space of the virtual user.

The computer program instructions may be comprised in a computer program, a non-transitory computer readable medium, a computer program product, a machine readable medium. In some but not necessarily all examples, the computer program instructions may be distributed over more than one computer program.

Although the memory 104 is illustrated as a single component/circuitry it may be implemented as one or more separate components/circuitry some or all of which may be integrated/removable and/or may provide permanent/semi-permanent/dynamic/cached storage.

Although the processor 102 is illustrated as a single component/circuitry it may be implemented as one or more separate components/circuitry some or all of which may be integrated/removable. The processor 102 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in The FIGS. may represent steps in a method and/or sections of code in the computer program 106. The illustration of a particular order to the blocks does not necessarily imply that there is a required or preferred order for the blocks and the order and arrangement of the block may be varied. Furthermore, it may be possible for some blocks to be omitted.

In any of the foregoing examples, the change in the mapping between the real space and the virtual space to enable improvement of the wireless charging parameter in dependence upon a wireless charging parameter, can be performed automatically in dependence upon a wireless charging parameter. Automatically means without user involvement.

In any of the foregoing examples, the change in the mapping between the real space and the virtual space to enable improvement of the wireless charging parameter in dependence upon a wireless charging parameter, can be performed semi-automatically in dependence upon a wireless charging parameter. Semi-automatically means with prompted user involvement.

In any of the foregoing examples, the change in the mapping between the real space and the virtual space to enable improvement of the wireless charging parameter in dependence upon a wireless charging parameter, can be performed by presenting an option for the user of the apparatus to change the mapping between the real space and the virtual space. This could be an option to identify if a change is desirable. This could be an option to accept or to reject a change.

The previous examples relate to methods for obtaining improved charging efficiency by modifying the rendered immersive content e.g. mediated reality content 141. This modification can be performed to the entire virtual scene 75, 76 by rotation, translation or transformation.

In an embodiment, the modification is performed only to a subset of the virtual scene 75, 76 (e.g. an interesting artificial virtual object 78 of interest or a part of the virtual scene 75, 76).

In yet another embodiment, the modification is performed in the rendering complexity such that the battery consumption (rate of energy consumption 154) matches the reduced charging rate (rate of energy transfer 152) arising due to reduced charging efficiency.

The methods allow optimal use of true wireless charging including:
  optimizing virtual scene 75, 76 orientation (defined by the mapping 160) based on charging need (i.e., place heavy load items near the charging unit);
  optimizing scene element positioning (defined by the mapping 160) e.g., if some parts of the scene are allowed to be moved and if they consume significant power, they are placed near the wireless charging station 10, while other parts are 'anchored' to set positions;
  placement of the virtual scene 75, 76 (defined by the mapping 160) based on charging need e.g., if the virtual scene 75, 76 is smaller than the consumption space, the placement (of artificial virtual objects 78) near the charging unit will optimize the power efficiency;
  additional item placement (defined by the mapping 160) near the wireless charging station 10, such as portals, in-game menus or gateways that require significant loading and battery consumption when accessed;
  pre-fetching mediated reality content 141 when close to the wireless charging station 10 and having maximum charging capability.

The above approach allows smaller batteries 120 for example in head-mounted devices 100 and thus lighter weight as charging can be optimized.

Rendering quality may be changed based on charging speed if a certain battery level threshold is preferred.

FIG. 11 illustrates modifying the scene placement such that the battery life of a head-mounted device 100 for immersive content consumption is maximized by enabling efficient wireless charging performance. The placement modification is performed by the desired combination of rotation, translation and transformation (e.g., resize). In this example, the content placement is modified such that the salient parts of the virtual scene 75, 76 is in proximity to the wireless charging station 10. This step not only improves charging performance but also retains content consumption experience (e.g., proximity to salient parts of the scene).

Another method for implementation is described in FIG. 13. In this case, the content creator has indicated the permission to allow modification of certain scene parts to enable adaptation based on consumption space constraints. One example of such a constraint can be the placement position of the wireless charging station 10. As shown in FIG. 13, a salient artificial virtual object $78_1$ is moved closer to the wireless charging station 10 to enable detailed persistent consumption of high complexity content. Such a salient artificial virtual object $78_1$ can be a multichannel audio content with high visual detail which is perused in detail for a long time. For example, a highly detailed representation of an engine or an opera. Some objects 78 may not be moved either because the content creator has indicated this or the objects are placed in the room (AR case) with respect to content anchors in the listening space (AR anchors in MPEG-I audio context).

In another embodiment of the implementation, a virtual scene 75, 76 with high detail is rendered with reduced detail.

A part of the entire scene is rendered with reduced detail if the charging efficiency is reduced. The reduced charging efficiency could be due to distance or occlusion (obstruction) between the wireless charging station 10 and the head-mounted device 100. The reduction in detail is performed in this case based on the detection of poor charging efficiency (e.g., calculated by the increase in charge level for a given period of time). A multichannel audio object is rendered as a single point source and the visual rendering mesh is replaced by a 2D rectilinear representation of the artificial virtual object 78. The exact method of downgrading the mediated reality content 141 is implementation specific but the goal is to match the power consumption to match the reduced charging rate arising from poor charging efficiency.

In one embodiment, if the charging level lowers below a certain threshold, the user is given a choice to enhance remaining battery life either by reducing rendering quality as explained above or allowing the modification of the scene (as in FIGS. 11 and 13).

FIG. 14 illustrates an example of pre-fetching strategy employed by the apparatus 100 based on the wireless charging efficiency. Consequently, when the head-mounted device 100 is closer to the wireless charging station 10 leading to higher charging efficiency, high definition (HD) indoor map visualizations are pre-fetched. On the other hand, in case of poor charging efficiency in case of distance D or occlusion (obstruction) to the wireless charging station 10, a lower resolution visualization is retrieved which results in reduced power consumption.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
   the at least one memory and the computer program code configured to, with the at least one processor, cause the apparatus to perform:
   wireless charging an energy storage device comprised in the apparatus;
   using energy from wireless charging and/or the energy storage device to render mediated reality content to a user of the apparatus, wherein the mediated reality content rendered to the user comprises a virtual scene determined with a virtual point of view within a virtual space, wherein a real point of view of the user, defined with a location and orientation of the user in real space, determines, via a mapping between the virtual space and the real space, the virtual point of view within the virtual space of the virtual user; and
   in dependence upon a wireless charging parameter, changing the mapping between the real space and the virtual space to enable improvement of the wireless charging parameter.

2. An apparatus as claimed in claim 1, configured as a head-mounted device, where the at least one memory and the computer program code are configured to, with the at least one processor, cause the apparatus to perform:
   measuring a change in the location and orientation in real space of a user wearing the head-mounted device to determine at least a change in the real point of view of the user; and rendering mediated reality content as a virtual scene determined with a virtual point of view that maps via the mapping to the real point of view of the user.

3. An apparatus as claimed in claim 1, wherein a change in the wireless charging parameter has a correlation with a change in wireless charging or wherein a change in the wireless charging parameter has a correlation with a change in energy consumption from rendering without a corresponding change in wireless charging.

4. An apparatus as claimed in claim 1, wherein:
   the wireless charging parameter is a parameter indicative of a rate of wireless charging decreasing below a threshold, and/or
   the wireless charging parameter is a parameter indicative that the apparatus is more than a threshold distance from a wireless charging station, and/or
   the wireless charging parameter is a parameter indicative of an occlusion between the apparatus and a wireless charging station.

5. An apparatus as claimed in claim 1, where the at least one memory and the computer program code are configured to, with the at least one processor, cause the apparatus to perform measuring the wireless charging parameter.

6. An apparatus as claimed in claim 1, wherein the virtual space comprises a plurality of artificial virtual objects, and wherein changing the mapping between the real space and the virtual space changes at least a portion of the mapping that maps at least a location in the virtual space of at least one artificial virtual object to a corresponding location in the real space to bring the corresponding location closer to a wireless charging station or to avoid an obstruction between the apparatus and a wireless charging station.

7. An apparatus as claimed in claim 6, where the at least one memory and the computer program code are configured to, with the at least one processor, cause the apparatus to perform selecting the artificial virtual object based on actual or expected energy consumption associated with rendering the artificial virtual object.

8. An apparatus as claimed in claim 6, where the at least one memory and the computer program code are configured to, with the at least one processor, cause the apparatus to perform selecting the artificial virtual object based on characteristics of the artificial virtual object, wherein selection is biased to select multichannel audio objects.

9. An apparatus as claimed in claim 1, wherein changing the mapping between the real space and the virtual space comprises changing the mapping of multiple artificial virtual objects of the virtual space to the real space to optimize the wireless charging parameter.

10. An apparatus as claimed in claim 1, wherein changing the mapping between the real space and the virtual space comprises rotating, translating and/or re-sizing the virtual space relative to the real space.

11. An apparatus as claimed in claim 1, where the at least one memory and the computer program code are configured to, with the at least one processor, cause the apparatus to perform controlling download of mediated reality content to the apparatus in advance of rendering the mediated reality content in dependence upon the wireless charging parameter.

12. An apparatus as claimed in claim 1, where the at least one memory and the computer program code are configured to, with the at least one processor, cause the apparatus to perform preferentially downloading mediated reality content, relating to an artificial virtual object mapped to a portion of the real space that is less effective for charging, while the apparatus is at a portion of the real space that is more effective for charging.

13. An apparatus as claimed in claim 1, where the at least one memory and the computer program code are configured to, with the at least one processor, cause the apparatus to perform preferentially downloading mediated reality content relating to an artificial virtual object mapped to a portion of the real space based on one or more of:
 effectiveness of the portion of the real space for charging,
 likelihood of the mediated reality relating to the virtual object being rendered, or
 expected energy consumption required for rendering the mediated reality relating to the virtual object.

14. A non-transitory program storage device readable by an apparatus, tangibly embodying a program of instructions executable by the apparatus for performing operations, the operations comprising:
 in dependence upon a wireless charging parameter associated with wireless charging of the apparatus, change a mapping between a real space and a virtual space to enable improvement of the wireless charging parameter, wherein the mapping between the real space and the virtual space controls six degrees of freedom, first person perspective mediated reality rendered to a user of the apparatus, wherein the mediated reality content rendered to the user comprises a virtual scene determined with a virtual point of view within a virtual space, and wherein a real point of view of the user, defined with a location and orientation of the apparatus in real space, determines, via the mapping the virtual point of view within the virtual space of the virtual user.

15. A method comprising:
 rendering six degrees of freedom, first person perspective mediated reality to a user of an apparatus, wherein mediated reality content rendered to the user is a virtual scene determined with a virtual point of view within a virtual space, and wherein a real point of view of the user, defined with a location and orientation of the user in real space, determines, via a first mapping the virtual point of view within the virtual space of the virtual user;
 in dependence upon a wireless charging parameter associated with wireless charging of the apparatus, changing the first mapping between the real space and the virtual space to a second mapping between the real space and the virtual space that is different to the first mapping; and
 rendering six degrees of freedom, first person perspective mediated reality to the user of the apparatus, wherein mediated reality content rendered to the user comprises a virtual scene determined with a virtual point of view within the virtual space, and wherein a real point of view of the user, defined with a location and orientation of the user in real space, determines, via the second mapping the virtual point of view within the virtual space of the virtual user, wherein the change in the first mapping to the second mapping improves wireless charging.

16. A method as claimed in claim 15, comprising:
 measuring a change in the location and orientation in real space of the user wearing a head-mounted device to determine at least a change in the real point of view of the user; and rendering mediated reality content as a virtual scene determined with a virtual point of view that maps via the mapping to the real point of view of the user.

17. A method as claimed in claim 15, wherein a change in the wireless charging parameter has a correlation with a change in wireless charging or wherein a change in the wireless charging parameter has a correlation with a change in energy consumption from rendering without a corresponding change in wireless charging.

18. A method as claimed in claim 15, wherein;
 the wireless charging parameter is a parameter indicative of a rate of wireless charging decreasing below a threshold, and/or
 the wireless charging parameter is a parameter indicative that the apparatus is more than a threshold distance from a wireless charging station, and/or
 the wireless charging parameter is a parameter indicative of an occlusion between the apparatus and a wireless charging station.

19. A method as claimed in claim 15, comprising measuring the wireless charging parameter.

20. A method as claimed in claim 15, wherein the virtual space comprises a plurality of artificial virtual objects, and wherein changing the mapping between the real space and the virtual space changes at least a portion of the mapping that maps at least a location in the virtual space of at least one artificial virtual object to a corresponding location in the real space to bring the corresponding location closer to a wireless charging station or to avoid an obstruction between the apparatus and a wireless charging station.

\* \* \* \* \*